United States Patent [19]

Ito et al.

[11] Patent Number: 5,506,657
[45] Date of Patent: Apr. 9, 1996

[54] INTERLEAVING DIGITAL COPIER SYSTEM

[75] Inventors: Norifumi Ito, Kawasaki; Jun Doi, Yokohama, both of Japan

[73] Assignee: Ricoh Company, Ltd., Tokyo, Japan

[21] Appl. No.: 247,754

[22] Filed: May 23, 1994

[30] Foreign Application Priority Data

Jun. 14, 1993  [JP]  Japan .................................. 5-142171

[51] Int. Cl.⁶ ........................... G03G 21/00; G06F 15/00; H04N 1/32
[52] U.S. Cl. ............................................. 355/202; 358/442
[58] Field of Search ...................................... 355/200, 202, 355/204; 358/442, 468

[56] References Cited

U.S. PATENT DOCUMENTS

| | | | |
|---|---|---|---|
| 4,860,115 | 8/1989 | Ogura | 358/443 |
| 4,937,762 | 6/1990 | Todome | 358/468 X |
| 4,947,345 | 8/1990 | Paradise et al. | 358/442 X |
| 4,972,226 | 11/1990 | Kawai | 355/202 |
| 5,140,430 | 8/1992 | Horii et al. | 358/300 X |
| 5,200,830 | 4/1993 | Imaizumi et al. | 358/442 X |
| 5,363,173 | 11/1994 | Alesio et al. | 355/204 |
| 5,377,016 | 12/1994 | Kashiwagi et al. | 358/468 X |

FOREIGN PATENT DOCUMENTS

| | | |
|---|---|---|
| 0410668 | 1/1991 | European Pat. Off. . |
| 0495433 | 7/1992 | European Pat. Off. . |

Primary Examiner—Fred L. Braun
Attorney, Agent, or Firm—Oblon, Spivak, McClelland, Maier & Neustadt

[57] ABSTRACT

A digital copier system wherein a plurality of applications share resources. When two or more applications generate requests for using resources including an image forming device, they are allowed to use the resources in an interleaved order matching a predetermined priority order. Accordingly, different applications alternatively access the resources simultaneously in an order determined by the priority order. For example, a copier can take priority over a printer or facsimile machine to use an image reading device while the printer or facsimile machine uses the image forming device. A user gives a desired priority order to the applications beforehand, and the system is conveniently used even when a plurality of applications share the image forming device.

11 Claims, 9 Drawing Sheets

INTERLEAVING DIGITAL COPIER SYSTEM

BACKGROUND OF THE INVENTION

The present invention relates to a digital copier system of the type converting a document image to an electric signal and reproducing it by an image forming device and, more particularly, to a digital copier system wherein a plurality of applications share resources.

Generally, a digital copier of the type described transforms a document image to an electric signal, executes various kinds of image processing with the electric signal, or image signal, and then causes an image forming device to reproduce the document image represented by the processed image signal. This type of copier can be provided with various kinds of applications, e.g., facsimile application, printer application, scanner application, and file system application. Then, the applications will share resources available in the copier, e.g., image reading device, image forming device, operation and display panel, memory, and peripheral units. The peripheral units include a document feeder and a sorter.

However, the problem with the digital copier described above is that it is implemented as a single task system wherein a plurality of applications share the resources. This kind of system prevents a plurality of users to use the applications at the same time. For example, when a person is operating the copier to produce copies, another person cannot use the printer application unless the person waits until the copying operation has been completed or interrupted. While only the printer application is in use, facsimile transmission using the facsimile application cannot be effected until the printer output has been completed or interrupted, despite that the facsimile application is capable of sending facsimile data by using only the image reading device.

In light of this, there has been proposed a multitask type digital copier system which allows the copier, printer, facsimile and other applications to share and selectively use the image reading device image forming device and other resources.

However, the conventional digital copier system of the type described has the following problem. Assume that a plurality of applications share the image forming device. Then, when one application occupies the image forming device over a long period of time, the other applications cannot use it. This is undesirable from the convenience standpoint.

SUMMARY OF THE INVENTION

It is, therefore, an object of the, present invention to provide a digital copier system which is convenient to use even when a plurality of applications share an image forming device.

In a digital copier system in which a plurality of applications, including a copier application, a printer application and a facsimile application, share and selectively use an image forming device, when two or more of the applications generate requests for using the image forming apparatus, the order in which the two or more applications use the image forming device is determined on the basis of a predetermined priority order.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
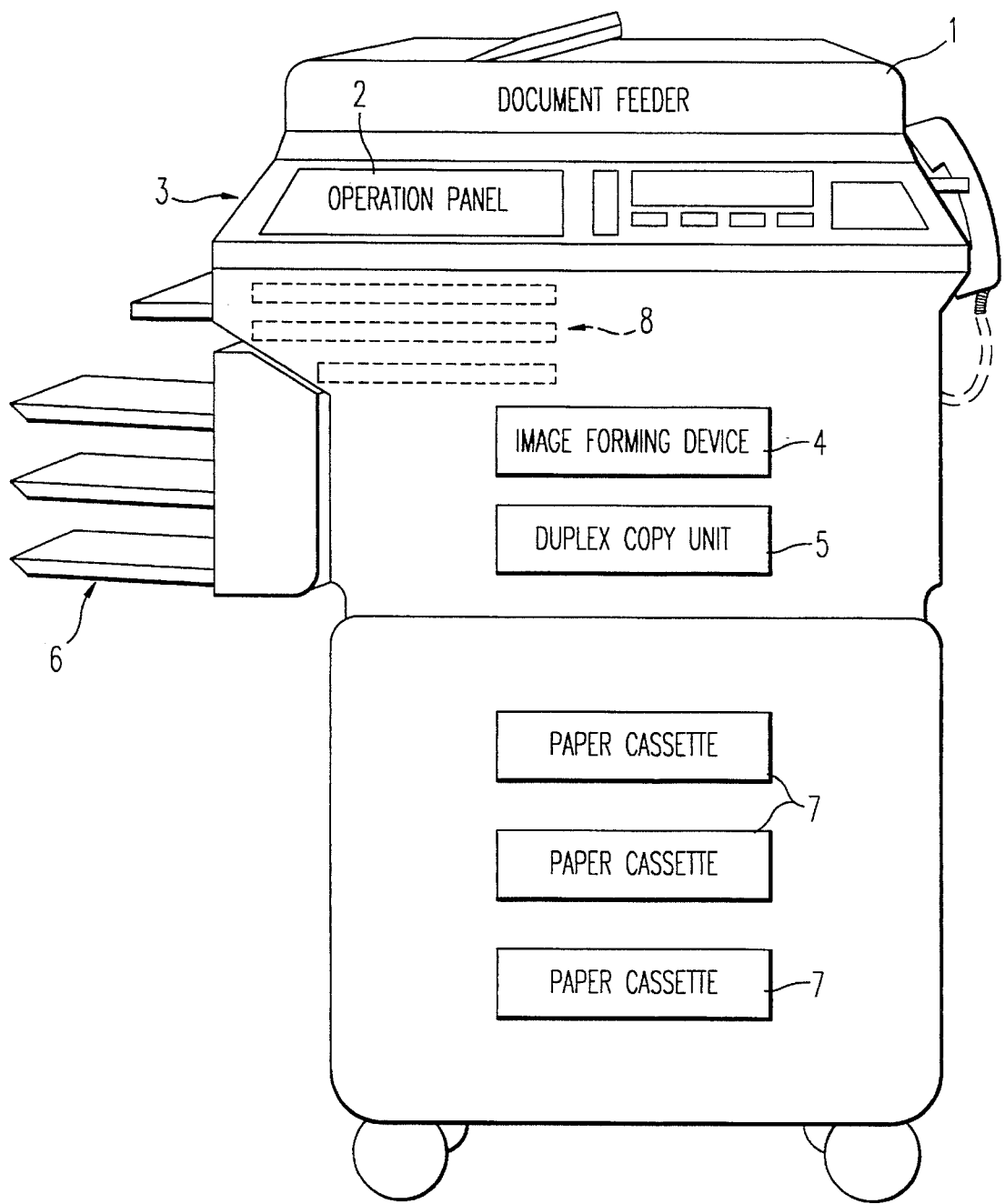
FIG. 1 schematically shows the general construction of a digital copier system embodying the present invention.

Referring to FIG. 1 of the drawings, a digital copier system embodying the present invention is shown. As shown, the system includes a document feeder 1 and an operation (and display) panel 2. After desired conditions have been entered on the operation panel 2, the document feeder 1 conveys a document to a predetermined reading position on an image reading device 3 and, after the document has been read, drives it away from the reading position. The image reading device 3 illuminates the document brought to the reading position thereof. The resulting reflection from the document is transformed to a corresponding electric signal, or image signal, by a solid state imaging device, e.g., a CCD (Charge Coupled Device) image sensor. An image forming device 4 forms an image represented by the image signal on a plain paper or a thermosensitive paper by an electrophotographic, thermosensitive, heat transfer, ink jet or similar conventional system.

As a paper is fed from any one of paper cassettes 7 to the image on forming device 4, the device 4 forms an image on one side of the paper. A duplex copy unit 5 is constructed to turn over the paper carrying the image on one side thereof and again feed it to the image forming device 4. As a result, an image is formed on the other side of the paper to complete a duplex copy. The duplex copy unit 5 has customarily been designed to refeed the paper immediately or to sequentially refeed a plurality of papers stacked one upon the other, from the bottom paper to the top paper. The papers, or duplex copies, driven out of the image forming device 4 are sequentially sorted by a sorter 6 in order of page or page by page.

Figure 2:
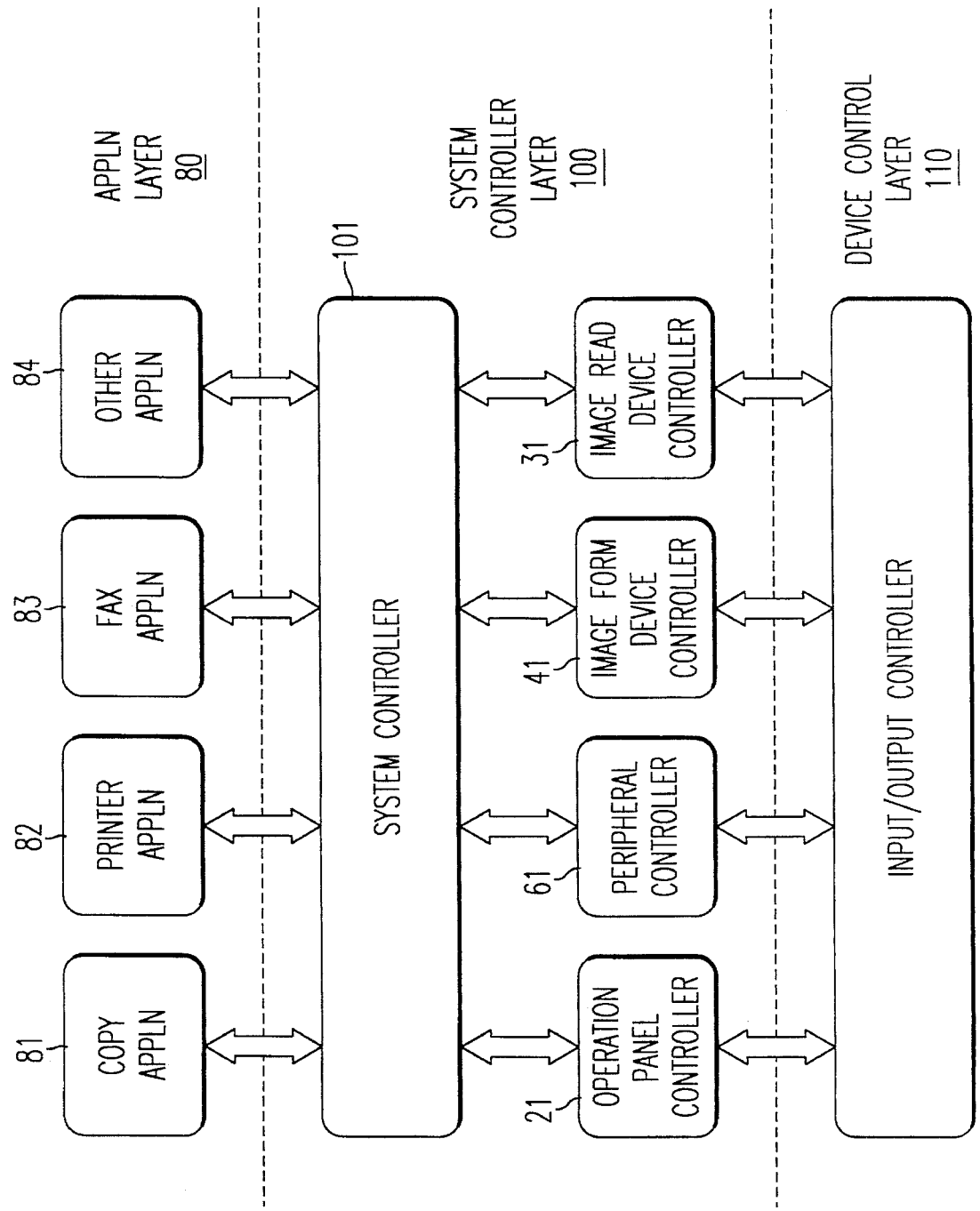
FIG. 2 is a block diagram schematically showing the embodiment.

Applications, generally 8, share the document feeder 1, operation panel 2, image reading device 3, image forming device 4, duplex unit 5, sorter 6, and paper cassettes 7 which are the resources built in the copier system. Specifically, as shown in FIG. 2, the applications include a copier application 81, a printer application 82, a facsimile (FAX) application 83 and other applications 84.

In the following description, let the electric signal or image signal output from the image reading device 3, an image signal input to the image forming device 4, and a synchronizing signal associated with the image signals be collectively referred to as a video signal. Signals for causing the reading device 3, image forming device 4 and applications 81–84 to interchange the video signal will be referred to as control signals or commands. Further, the word "system" should be understood to mean the digital copier having a plurality of applications 81–84, as stated above. A controller for controlling the system will be called a system controller.

The operation panel 2 is, in many cases, provided with an extremely limited capacity even when the system is loaded with a plurality of applications 81–84. In such a case, the operation panel 2 has to be given up for a desired application. In this sense, pictures, each being assigned to a particular application, will be referred to as virtual pictures. Although a plurality of virtual pictures exist, only one of them appears on the panel 2 at a time.

The application allowed to occupy the operation panel 2 will be called a foreground application. Substantially all the key inputs from the system are reported to the foreground application, while only the virtual picture of the foreground application appears on the panel 2. Let the other applications not occupying the panel 2 be referred to as background applications. Although the background applications cannot occupy the panel 2, they do not stop operating; only limited key inputs are reported thereto from a system controller 101. It follows that while the image forming device 4 is idle, the printer application 82, for example, can access the image forming device 4 when supplied with print data from a host personal computer, not shown, despite that it is a background application.

The system controller 101 supervises each of the resources 1–7 as to the idle or unoccupied state. The application entitled to use the operation and display panel 2 first by the system controller 101 when the power source of the system is turned on will be referred to as a start-up application.

Words "insertion output" or "interleave", which will be used in relation mainly to the output of an image, will be described. Conventional single task type image output is not effected by an operation other than an operation under way, i.e., until a sequence of cycles having the same purpose, i.e., a single job completes. For example, advanced digital copiers have multiplex functions, i.e., copying function and facsimile or printer function as well as other functions. Most of them execute output on a function (job) basis such that the copying function, for example, is followed by a printer output when it completes. By contrast, in the illustrative embodiment, inserting one job output in another job output is referred to as "interleave". For example, the embodiment implements printer output during the course of copier output without stopping the machine.

A word "mode" is indicative of a condition wherein a given application is entitled to display. For example, when the printer application 82 has a right to display, the digital copier will be described as being in a printer mode. The transition from one mode to another mode is controlled by the system controller 101.

As the system becomes complicated, the applications have to be adaptive to each user. However, it is impractical to satisfy all the users' needs at the time of shipment. The only measure left is dealing with the applications after the system has been put on the market. In light of this, the embodiment includes a nonvolatile RAM (Random Access Memory) and has a user-oriented system setting function. Let this function be referred to as user setting hereinafter.

When the image forming device 4 is implemented by an electrophotographic process using a laser beam, the writing density is selectable over a certain range. This function will be expressed as variable resolution (VR) or multiresolution (MR) hereinafter. Further, in this type of copier, the number of supplies are too great to allow all the persons to use the copier limitlessly. Limiting the persons who can use the copier will be referred to as user limitation. To specify, limit and supervise the users, use is made of a coin rack, key counter, key card, private code, or similar implementation.

In the multitask type system architecture wherein the applications 81 share the resources 1–7, the system is controlled by a system control layer 100, as shown in FIG. 2. The system control layer 100 has, in addition to the system controller 101, an operation panel controller 21, an image reading device controller 31, an image forming device controller 41, and a sorter controller 61. A device control layer 110 transforms commands, control signals and other logical commands from the system control layer 100 to corresponding signals for driving and inputting mechanical inputs and outputs which actually drive the devices, e.g., clutches, sensors and motors. The applications 81–84 coexist in an application layer 80 due to the function provided by the system control layer 100.

Figure 3:
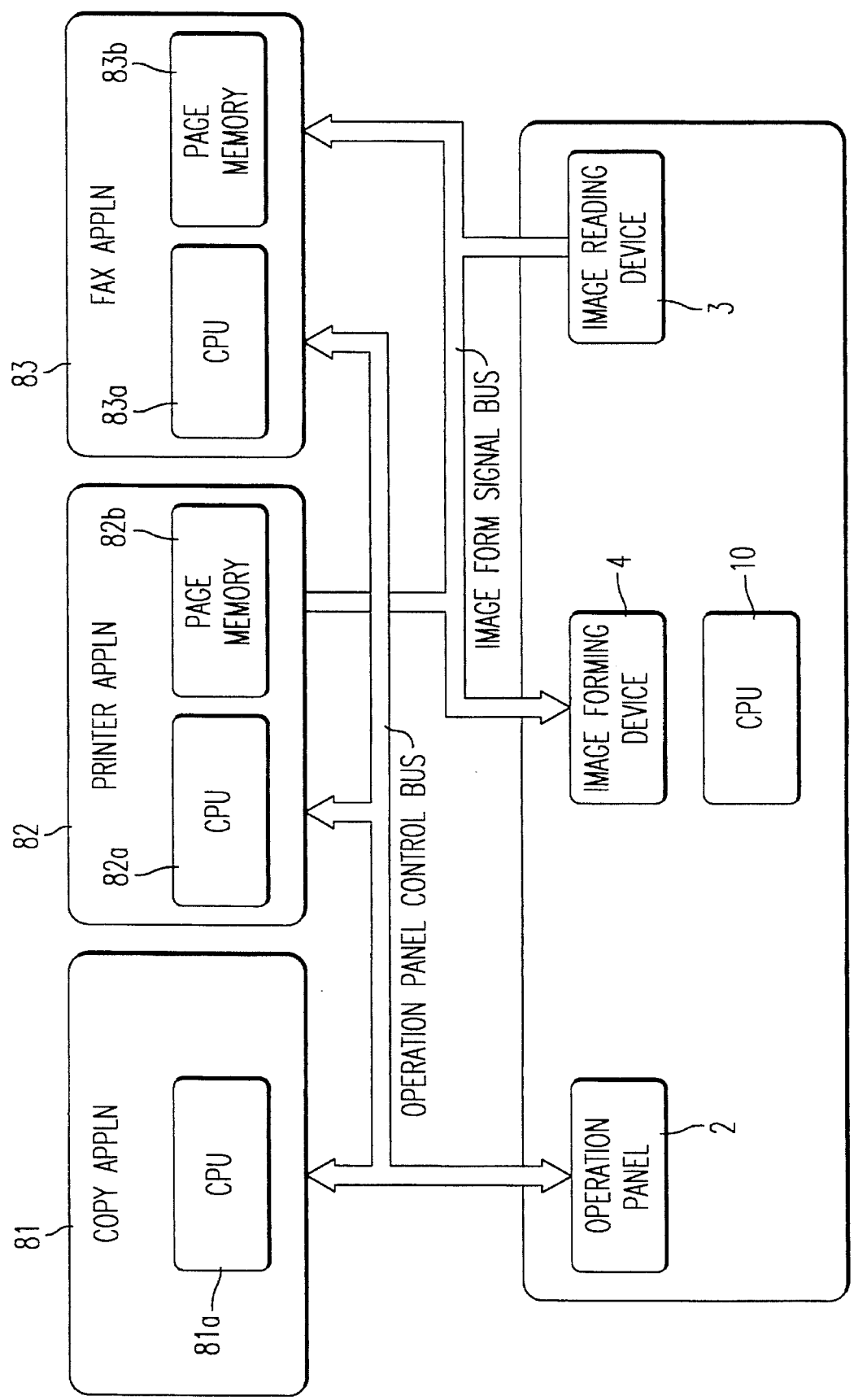
FIG. 3 is a schematic block diagram of a specific hardware architecture included in the embodiment.

FIG. 3 shows a specific hardware architecture implementing the system. As shown, CPUs (Central Processing Units) 81a, 82a and 83a are assigned to the applications 81, 82 and 83, respectively. A single CPU 10 is assigned to the image reading device 3 and image forming device 4. The single CPU 10, therefore, can control both the system control layer 100 and the device control layer 110. The printer application 82 and facsimile application 83 are provided with page memories 82b and 83b, respectively. In FIG. 3, as well as in FIGS. 4–7 to follow, the other applications 84 are not shown.

Figure 4:
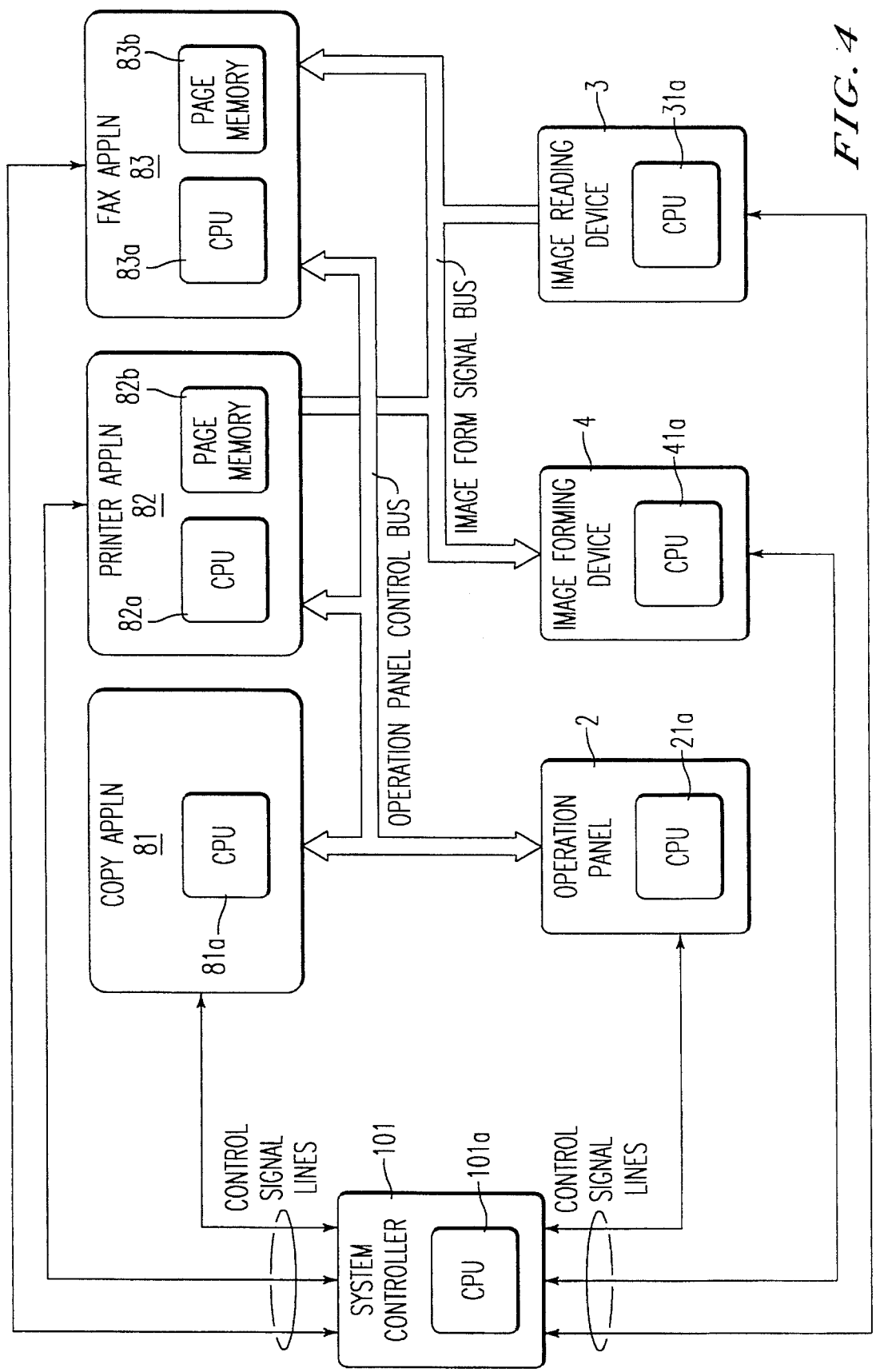
FIG. 4 is a schematic block diagram showing another specific hardware architecture.

FIG. 4 shows an alternative hardware architecture. As shown, CPUs 81a–83a, 101a, 21a, 31a and 41a are respectively included in the system controller 101 and resources 2–4. Commands from the CPU 101a of the system controller 101 are transferred to the CPUs 81a–83a and 21a–41a over respective control signal lines. In this way, the illustrative embodiment is practicable with various kinds of hardware arrangements.

Figure 5:
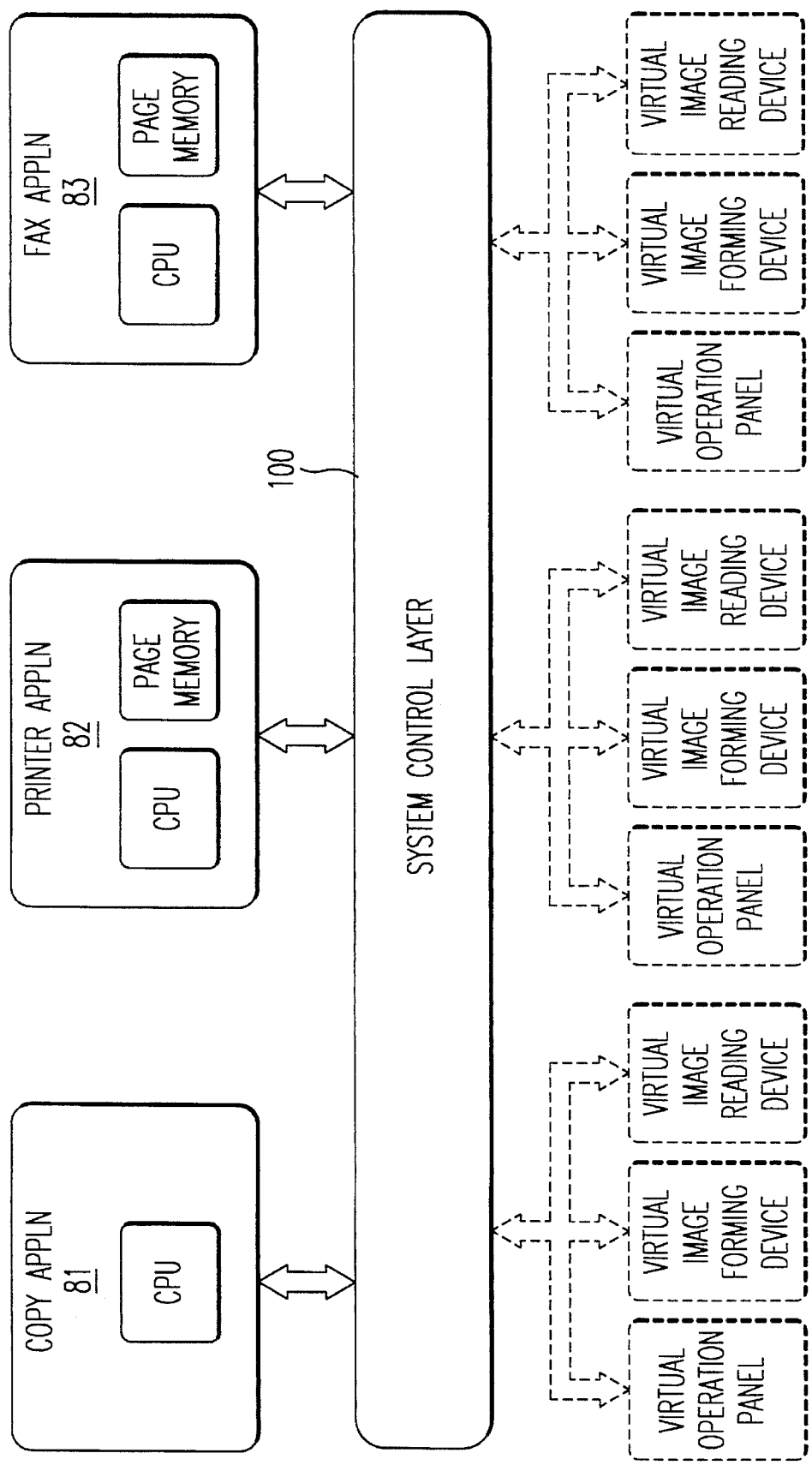
FIG. 5 is a schematic block diagram representative of a relation between an application layer and a system control layer included in the embodiment.

A reference will be made to FIGS. 5–7 for describing virtual resources particular to the embodiment. The system control layer 100 implements a function appearing, as seen from the application layer 80, as if virtual resources were assigned to all the applications 81–84, as indicated by dotted blocks in FIG. 5. As a result, it is not necessary for the application layer 80 to supervise system conditions, i.e., the systems control layer 100 can supervise all the applications under the same conditions. Specifically, when one of the applications 81–84 desires to occupy a certain resource, it sends a request to the system control layer 100. In response, the system control layer 100 returns to the application a result of decision relating to the status of the resource of interest. Then, the application sees whether or not it can use the resource and uses it if possible. Basically, the system control layer 100 deals with the execution rights of the applications 81–84 by the same procedure.

The actual resources 2–4 are provided one each, as shown in FIG. 1.

Hence, when requests for using the virtual resources conflict, the system control layer 100 has to perform exclusive control or time division assignment in order to transfer the actual right to use the resources 2–4. Which of the exclusive control and time division assignment should be executed depends on the kind of the resource and previously mentioned user setting.

Figure 6:
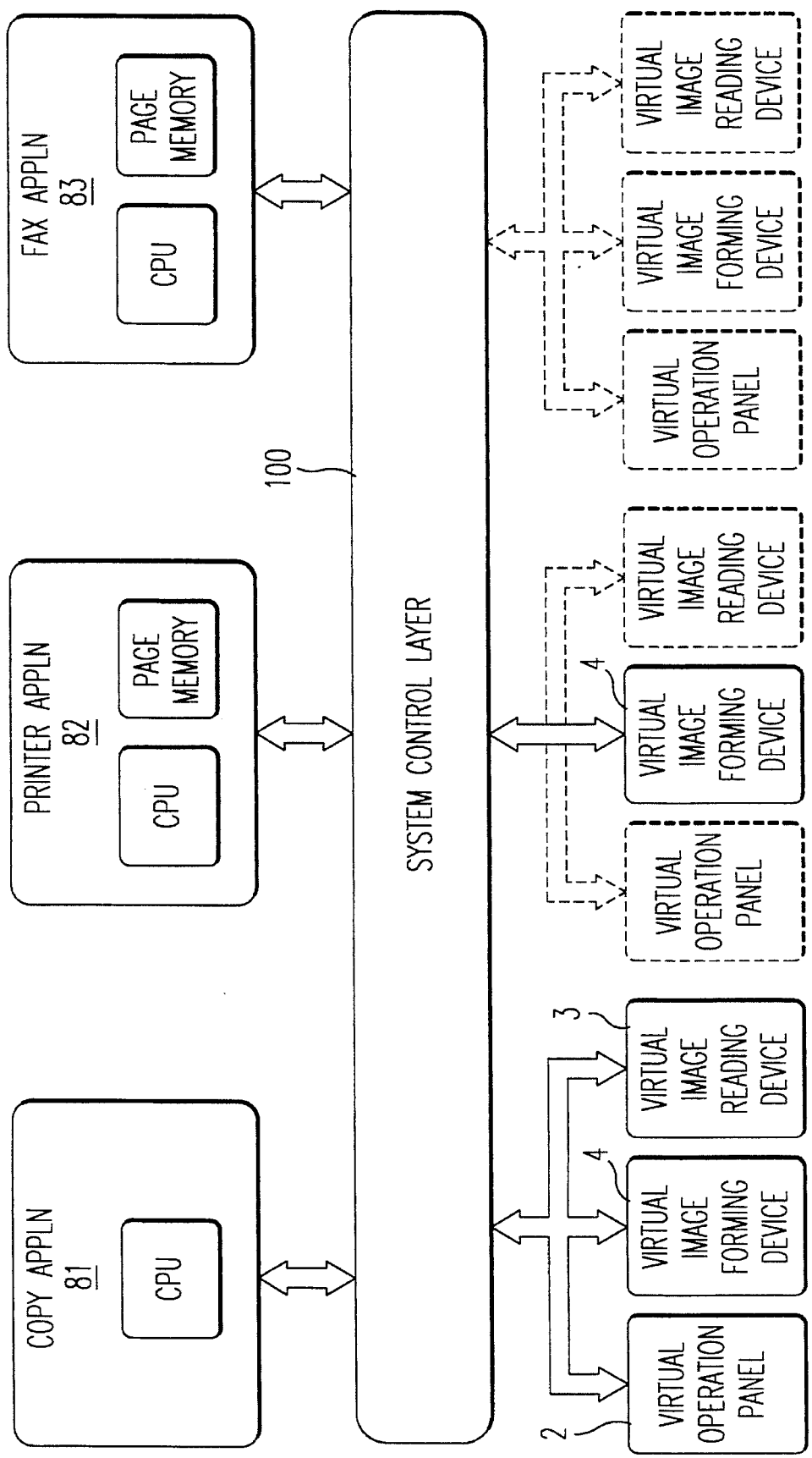
FIG. 6 is a schematic block diagram demonstrating an interleave operation to be performed by a copy application and a printer application loaded in the embodiment.
Figure 7:
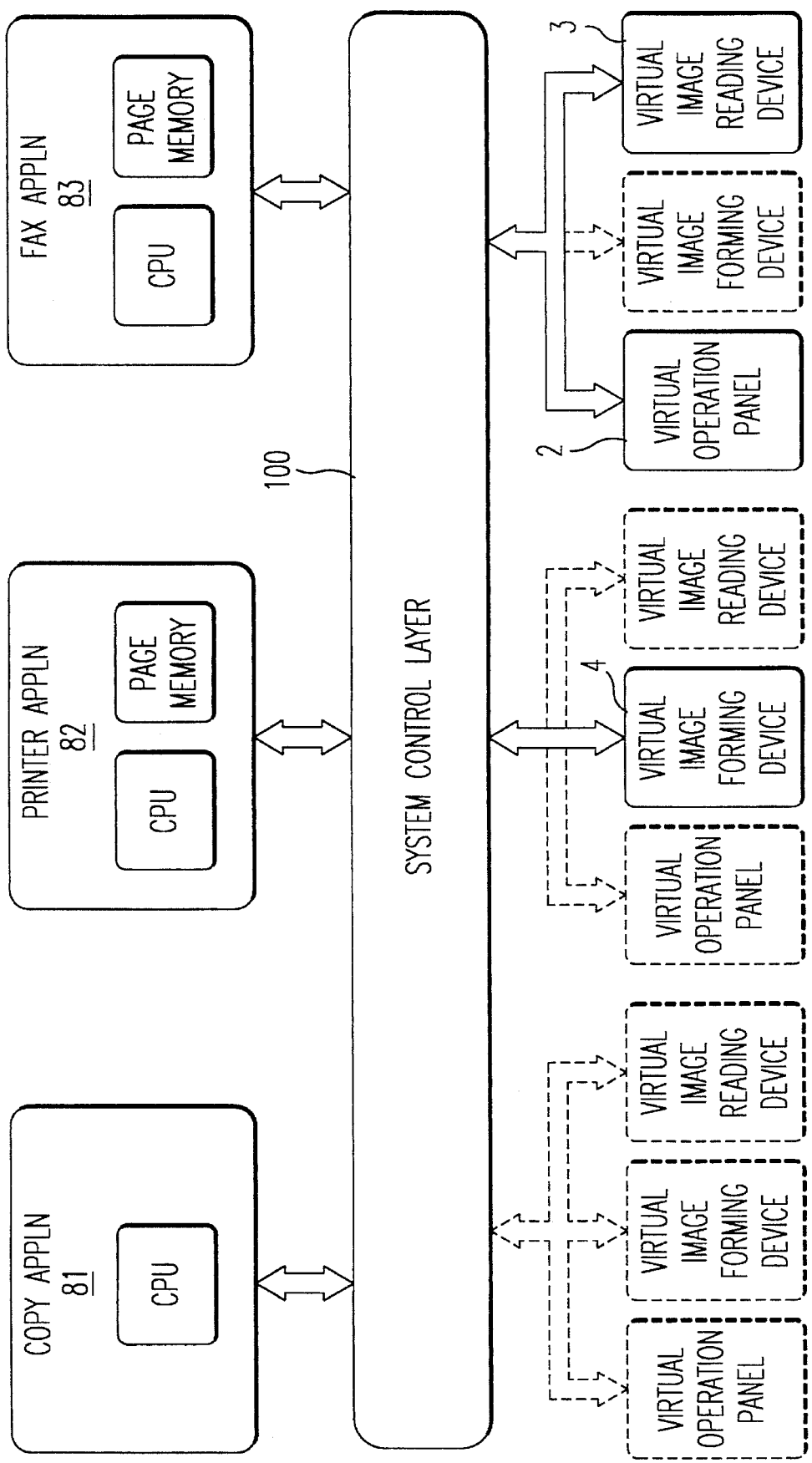
FIG. 7 is a schematic block diagram indicative of the parallel operations of the printer application and a facsimile application which is also loaded in the embodiment.

In FIGS. 6 and 7, the virtual resources indicated by dotted lines show that the associated application does not have the right to execute them, while the virtual resources indicated by solid lines show that it has the right to execute them. FIG. 6 demonstrates a specific operation in which the copy application 81 and printer application 82 operate in the interleave mode, i.e., one job output is inserted in another job output, as stated earlier. In the condition of FIG. 6, the copy application 81 has the right to occupy and is occupying all the resources of the reading device 3 and image forming device 4. When the printer application 82 sends a request for using the image forming device 4 and if the interleave mode is set up by user setting, the system control layer 100 assigns the image forming device 4 to the applications 81 and 82 on a time division basis.

The time division assignment stated above allows the resource execution right to be dynamically transferred from one application to another application. As a result, the outputs of the applications 81 and 82 are produced from the image forming device 4 together without the device 4 stopping operating. This is successful in minimizing the waiting times of the applications 81 and 82.

FIG. 7 demonstrates another specific operation in which the printer application 82 and facsimile application 83 operate in parallel. In the event of transmission, the facsimile application 83 uses only the operation panel 2 and image reading device 3 while the printer application 82 needs only the image forming device 4. Therefore, despite that the two applications 82 and 83 send resource requests at the same time, the resources do not conflict. In this condition, the requests from the applications 82 and 83 can be accepted without the exclusive control or the time division assignment, implementing facsimile transmission and printer output at the same time.

The image forming device, or plotter, 4 is operated as follows. The present invention allows a desired priority order to be given to the applications 81–84 as to the use of the image forming device 4. Specifically, when keys provided on the operation panel 2 are operated in a predetermined combination, a user-oriented program mode begins to allow the user to register a desired priority order. The priority order is entered by use of numerals "i" to "9". When two or more of the applications 81–84 generate plotter requests at the same time, the plotter 4 is assigned to the application having the highest priority; the other application having lower priority waits until the next paper feed timing has been reached.

For example, assume that the facsimile application 83 is given priority over the other applications 81, 82 and 84. Then, even when the system is in a copying operation, facsimile data received from a remote station is output by the interleave mode as soon as the output is allowed, and then the copying operation is resumed at the next paper feed timing.

On the other hand, assume that two or more of the applications 81–84 are given the same degree of priority. In this case, when the applications having the same degree of priority generate requests at the same time, the output right is given to them alternately, i.e., in a round robin fashion. Specifically, assume that the same degree of priority is given to the copier application 81 and printer application 82, and that the image forming device 4 is continuously accessed by the applications 81 and 82, i.e., the next output occurs after a single paper feed at the time when a paper can be fed. Then, the outputs of the applications 81 and 82 occur alternately, i.e., copy output, printer output, copy output, printer output and so forth. At this instant, the sorter 6 may sort the resulting recordings to the bins thereof on an application basis so as to free the users of the applications from confusion.

As stated above, when a plurality of users share a single copier, they are entitled to use the copier equally. Of course, the same degree of priority may be given to three or more applications. When two or more of the applications do not generate a request at .the same time, the application first requested by the system controller 101 is entitled. Specifically, when a single user uses a single application, a procedure customary with a copier or application is executed.

When the image forming device 4 is implemented by an electrophotographic process using a laser beam, the rotation speed of a polygon mirror may be changed to change the writing density in a plurality of steps (MR). On the other hand, the optimal writing speed sometimes differs from one application to another application. Therefore, the rotation speed of the polygon mirror has to be changed every time one of the three or more applications having the same degree of priority outputs in the round robin fashion. However, since about three seconds is necessary for the polygon mirror to be stabilized at the rated rotation after the rotation speed has been changed, about three seconds is wasted every time the application is switched over, degrading the throughput of the entire system. To eliminate this problem, the embodiment first gives, when two or more applications generate an output request, priority to the application whose writing density is desired more often or gives, when the same degree of priority is given to such applications, priority to the application whose writing density is equivalent to that of the application effected paper feed last. Further, even under the MR condition, the interleave output is achievable wasting a minimum of time.

When the keys on the operation panel 2 are operated in a predetermined combination, a user-oriented program mode begins which allows the user to set the permission and inhibition of interleave. Here, interleave refers to inserting, while a certain application is executing printing, the print output of another application. Regarding the permission of interleave, the advantage described-in relation to the priority order setting is also achievable. However, when the sorter 6 is absent, papers resulting from two or more applications are mixed together on a single tray, confusing the user. In light of this, the embodiment, in principle, inhibits the output of a background application not having the display right and causes the user to intentionally select a desired application mode on the operation panel 2. Alternatively, only if the foreground application is idle, the embodiment automatically replaces the foreground application with a background application. Further, the embodiment is constructed such that an application with the previously mentioned user limitation is inhibited from being output from a background application, i.e., it can be output only after the user has selected the foreground application intentionally. This is to eliminate an occurrence that while the first user is using the foreground application by use of a coil rack, key card, key counter or similar private implement, the second user uses a background application; otherwise, the printings produced by the second user would be charged to the first user. The user limitation can be set application by application.

Figure 8:
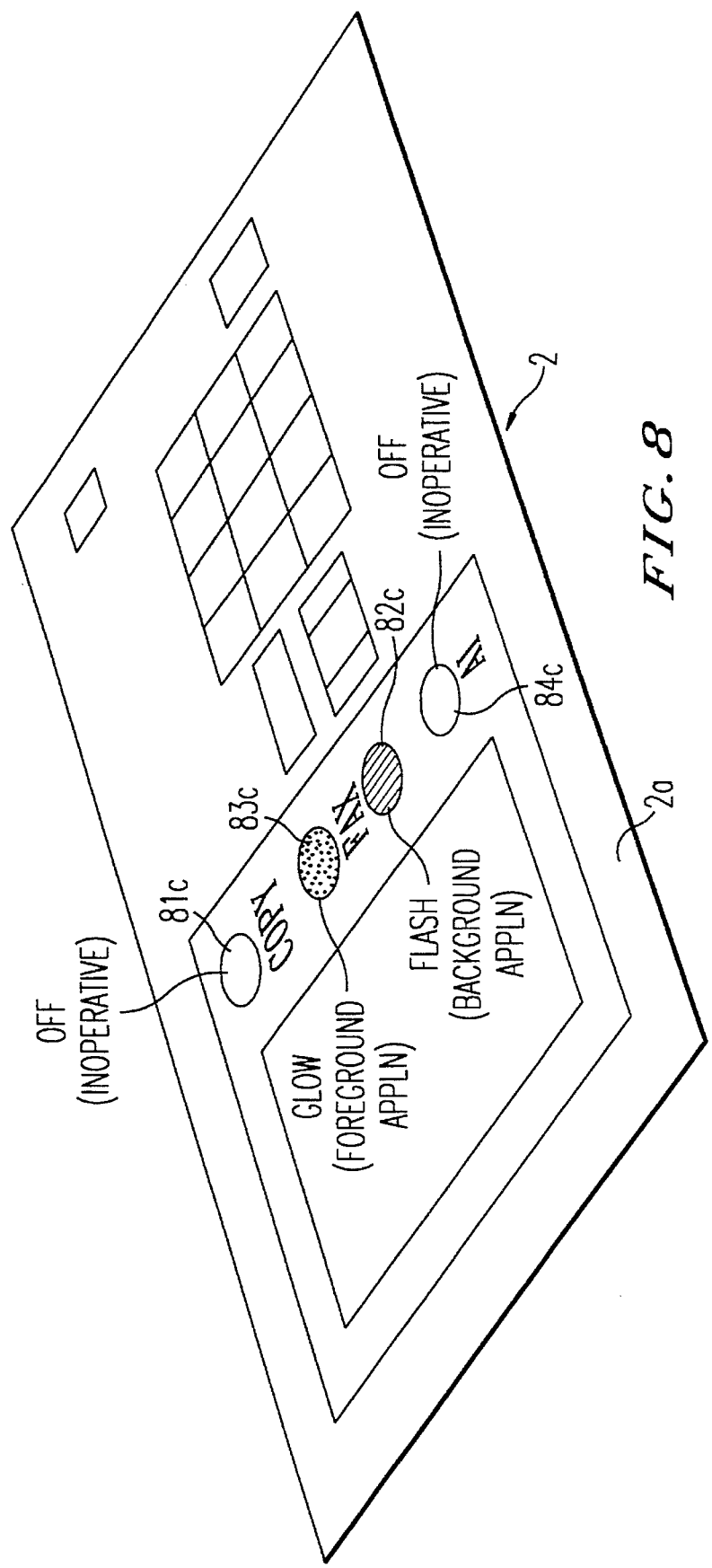
FIG. 8 shows a specific arrangement of an operation and display panel included in the embodiment.

When a background application starts output while the foreground application is in use, the embodiment informs the user of the foreground application of the start of the background application. FIG. 8 shows a specific arrangement of the operation panel 2. As shown, LEDs (Light Emitting Diodes) 81c, 82c, 83c and 84c are positioned on the operation panel 2 and assigned to the applications 81, 82, 83 and 84, respectively. In the condition shown in FIG. 8, the facsimile or foreground LED 83c is glowing while the printer or background LED 82c is flashing to indicate that the printer application is in use. The LED 82c continuously flashes from the beginning of paper feed for the background to the end of the same. The LED for the background in use may be replaced with a guidance message, e.g., "Priority is given to FAX" appearing on an LCD (Liquid Crystal Display) 2a provided on the operation panel 2. This allows a person using the foreground application to distinguish papers resulting from the background application from papers resulting from the foreground application.

In addition, the embodiment is capable of giving priority to an interrupt copy mode which has urgency. This promotes the convenient use of the system.

Figure 9:
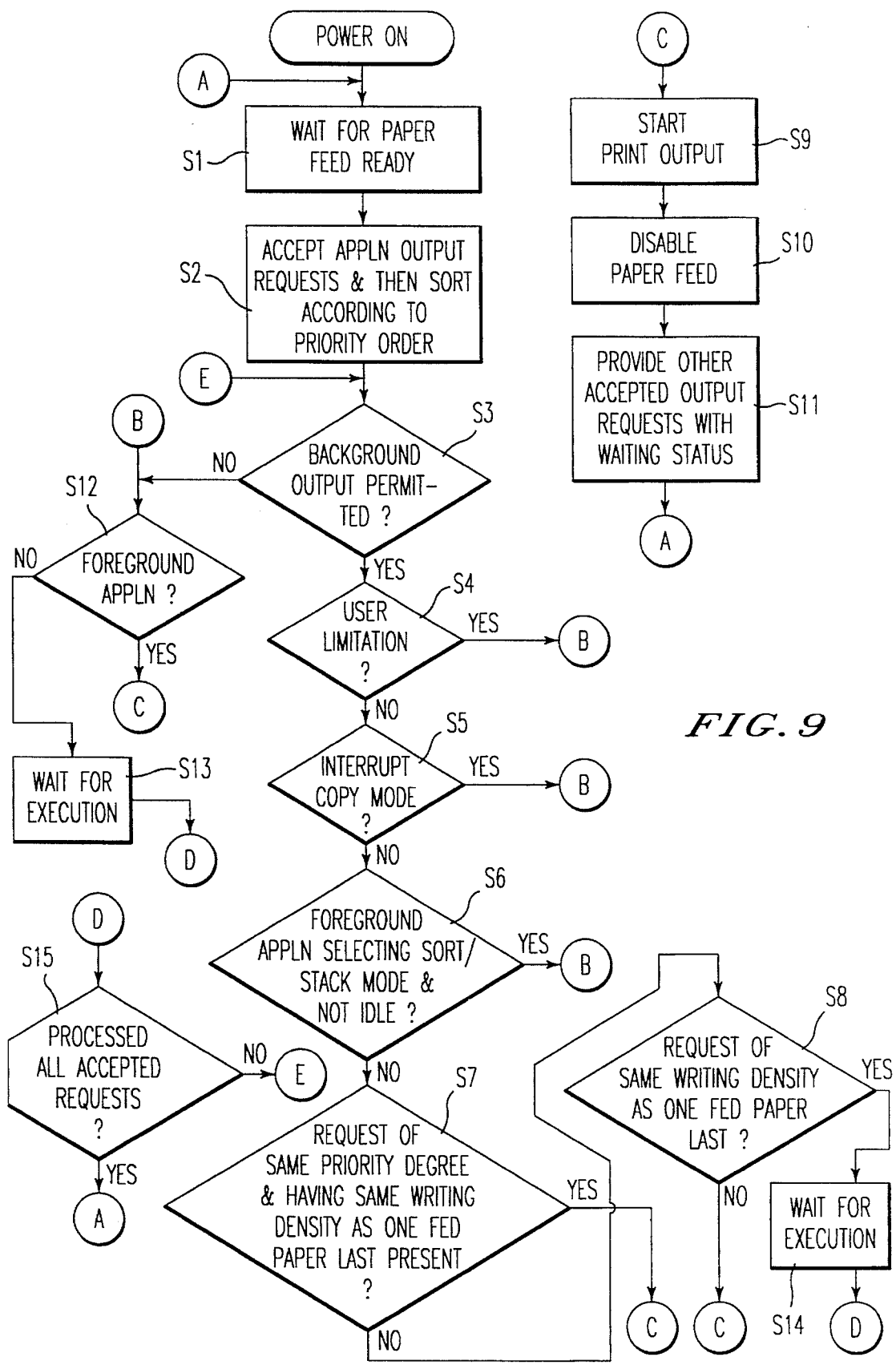
FIG. 9 is a flowchart representative of a specific operation of the embodiment.

Referring to FIG. 9, the output procedure will be described. As shown, when the power source of the system is turned on, the system waits until a condition ready to feed a paper, e.g., a condition wherein a fixing unit is heated to a predetermined temperature and a paper jam is absent, has been reached (step S1). After the applications have generated output requests, a sorting operation associated with the application having highest priority is executed (step S2). Subsequently, whether or not the application is allowed to output from the background is determined (step S3). If the answer of the step S3 is positive, (Yes) the program advances to a step S4; if otherwise, it advances to a step S12. In the step S12, if the application of interest is the foreground, output begins (step S9), the paper feed is inhibited (step S10), the other output requests accepted are caused to wait (step S11), and then the operation returns to the step S1. If the application is not the foreground (No, step S12), the program advances to a step S13 to wait for execution. When all the requests accepted have been dealt with (step S15), the program returns to the step S1; otherwise, it returns to the step. S3.

If the application is allowed to output from the background (Yes, step S3), whether or not user limitation is attached to the application is determined (step S4). If the answer of the step S4 is negative, (No), whether or not the foreground application has selected a sort mode or a stack mode and whether or not it is not idle are determined (step S6). If the answer of the step S6 is positive, the program advances to the step S12; if otherwise, it advances to a step S7. In the step S7, whether or not a request having the same writing density as the application of the same priority and fed a paper immediately before is present is determined. If the answer of the step S7 is negative, whether or not the request is identical in writing density with the immediately preceding request is determined (step S8). If the answer of the step S8 is negative, the step S9 is repeated; if otherwise, the program advances to a step S14 to wait for execution and then to a step S15.

In summary, it will be seen that the present invention provides a digital copier system which allows, when two or more applications generate requests for using an image forming device, the applications to use it in a particular order matching a predetermined priority order. Hence, only if the user gives a desired priority order to the applications beforehand, the system can be conveniently used even when a plurality of applications share the image forming device. Also, when two or more applications generate such a request, the right to use the image forming device is transferred to them alternately. Therefore, when a plurality of users share a single copier, the right is given to all the users equally, also promoting the convenient use of the system.

Further, in response to the requests from two or more applications, the system gives priority to the application whose writing density is desired most often. This successfully reduces the period of time necessary for the writing speed to be changed, thereby increasing the throughput of the entire system.

Various modifications will become possible for those skilled in the art after receiving the teachings of the present disclosure without departing from the scope thereof.

What is claimed is:

1. A digital copier system comprising:
   a plurality of applications, including a copier application, a printer application and a facsimile application, share and selectively use resources including an image forming device, when two or more of said applications generate requests for using said resources, an order in which said two or more applications use a particular resource of said resources is determined on the basis of a predetermined priority order and are interleaved, wherein said applications use different said resources simultaneously.

2. A system as claimed in claim 1, wherein when two or more of said applications having a same degree of priority generate the requests, a right to use said image forming device is given alternately.

3. A system as claimed in claim 1, wherein said plurality of applications are each capable of selecting a particular writing density available with said image forming device, said system first giving, when two or more of said applications generate the requests, priority to one application whose writing speed is desired most often.

4. A system as claimed in claim 1, wherein the resources further comprise:
   an image reading device for reading an image to be printed by the image forming device.

5. A system as claimed in claim 4, wherein the resources further comprise:
   an operation panel for displaying a status of an application which is currently using the operation panel and for selectively displaying the image associated with the application.

6. A digital copier system comprising:
   a plurality of resources for processing an image;
   a system controller for controlling access to the resources;
   a plurality of applications for requesting access to the resources from the system controller; and
   wherein, the system controller interleaves access to the resources and different said applications access different said resources simultaneously to reduce the time required to complete all said applications.

7. A system according to claim 6, wherein the resources comprise:
   an image reading apparatus for reading the image;
   an image forming apparatus for creating a hard copy of the image; and
   an operation panel for interfacing with the system controller.

8. A system according to claim 7, wherein the applications comprise:
   a facsimile application for sending facsimiles of the image; and
   a copier for photocopying the image.

9. A system according to claim 8, wherein the applications further comprise:
   a printer for printing the image from an electronic memory.

10. A system according to claim 6, wherein the system controller further comprises:

means for determining priority of the applications to determine which of said applications have priority access to the resources.

11. A system according to claim 10, wherein the means for determining priority further comprises:

means for giving priority to an application, which requires the same writing density to generate a hard copy of the image, when a plurality of said applications have equal priority.

\* \* \* \* \*